US011976229B2

United States Patent
Zhang et al.

(10) Patent No.: US 11,976,229 B2
(45) Date of Patent: May 7, 2024

(54) NEGATIVE LIQUID CRYSTAL COMPOSITION, AND LIQUID CRYSTAL DISPLAY ELEMENT OR LIQUID CRYSTAL DISPLAY

(71) Applicant: Shijiazhuang Chengzhi Yonghua Display Material Co., ltd., Hebei (CN)

(72) Inventors: Wei Zhang, Hebei (CN); Qing Cui, Hebei (CN); Gang Wen, Hebei (CN); Sumin Kang, Hebei (CN)

(73) Assignee: Shijiazhuang Chengzhi Yonghua Display Material Co., ltd., Hebei (CN)

( * ) Notice: Subject to any disclaimer, the term of this patent is extended or adjusted under 35 U.S.C. 154(b) by 0 days.

(21) Appl. No.: 17/997,706

(22) PCT Filed: Aug. 25, 2020

(86) PCT No.: PCT/CN2020/110967
§ 371 (c)(1),
(2) Date: Nov. 1, 2022

(87) PCT Pub. No.: WO2021/253625
PCT Pub. Date: Dec. 23, 2021

(65) Prior Publication Data
US 2023/0167362 A1    Jun. 1, 2023

(30) Foreign Application Priority Data
Jun. 16, 2020    (CN) .......................... 202010550026.9

(51) Int. Cl.
*G02F 1/1333*    (2006.01)
*C09K 19/12*    (2006.01)
*G02F 1/137*    (2006.01)

(52) U.S. Cl.
CPC .......... *C09K 19/12* (2013.01); *G02F 1/13712* (2021.01); *C09K 2019/122* (2013.01); *C09K 2019/123* (2013.01)

(58) Field of Classification Search
CPC .... C09K 19/12; C09K 19/30; C09K 19/3001; C09K 2019/122; C09K 2019/123; G02F 1/1333; G02F 1/13712
See application file for complete search history.

(56) References Cited

U.S. PATENT DOCUMENTS 9,376,620 B2 *   6/2016   Saito .................. C09K 19/3098
2009/0279089 A1   11/2009   Wang

| 2015/0299575 | A1 | 10/2015 | Saito et al. |
| 2015/0353826 | A1 | 12/2015 | Saito et al. |
| 2016/0002532 | A1 | 1/2016 | Saito et al. |
| 2019/0375986 | A1* | 12/2019 | Xing ....................... C09K 19/12 |
| 2023/0167362 | A1* | 6/2023 | Zhang .................... C09K 19/12 252/299.63 |

FOREIGN PATENT DOCUMENTS

| CN | 1823151 A | 8/2006 |
| CN | 105647544 A | 6/2016 |
| CN | 109669290 A | 4/2019 |
| CN | 110408410 A | 11/2019 |

* cited by examiner

*Primary Examiner* — Geraldina Visconti
(74) *Attorney, Agent, or Firm* — Muncy, Geissler, Olds & Lowe, P.C.

(57) ABSTRACT

The present invention belongs to the technical field of liquid crystal materials, and in particular relates to a negative liquid crystal composition and a liquid crystal display element or liquid crystal display containing the liquid crystal composition. The present invention discloses a negative dielectric nematic liquid crystal composition, comprising a compound represented by Formula I, one or more compounds represented by Formula II, and one or more compounds represented by Formula III. The liquid crystal composition has a relatively low rotational viscosity ($\gamma_1$), a high clearing point (Cp), a good solubility and a high stability to heat and light (VHR) on the basis of maintaining an appropriate optical anisotropy ($\Delta$n), and can be used for developing a liquid crystal display element or liquid crystal display with a low cell thickness, a wide temperature for display, and a fast response.

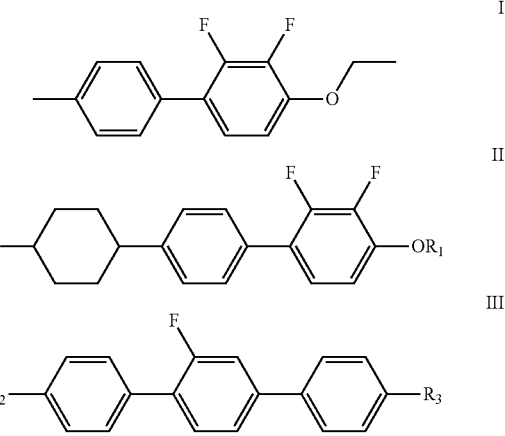

4 Claims, No Drawings

NEGATIVE LIQUID CRYSTAL COMPOSITION, AND LIQUID CRYSTAL DISPLAY ELEMENT OR LIQUID CRYSTAL DISPLAY

TECHNICAL FIELD

The present invention belongs to the technical field of liquid crystal materials, and in particular relates to a negative liquid crystal composition and a liquid crystal display element or liquid crystal display containing the liquid crystal composition.

BACKGROUND ART

With the development of display technology, flat display devices such as liquid crystal display (LCD) are widely used in mobile phones, televisions, personal digital assistants, digital cameras, notebook computers, desktop computers and other consumer electronic products due to their advantages of a high image quality, a low power consumption, a thin body, a wide application range, etc., and have become the mainstream of display devices.

For liquid crystal materials used in display devices, it is required to have the characteristics of (1) a low driving voltage: the liquid crystal materials have appropriate negative dielectric anisotropy and elastic coefficient K; (2) a fast response: the liquid crystal materials have appropriate rotational viscosity $\gamma_1$ and elastic coefficient K; and (3) a high reliability: a high charge retention rate, a high specific resistance value, excellent high-temperature stability, strict requirements on the stability to ultraviolet light (UV light) or conventional backlight illumination, etc. With the wide application of liquid crystal displays, the requirements for the performance thereof are also increasing.

In addition, with the gradual popularization of 5G and consumers' pursuit of higher display quality, 90 Hz, 120 Hz and even higher refresh frequency displays have been continuously developed. Such high refresh frequency displays require the liquid crystal material to have not only a lower $\gamma_1/K$ but also a higher optical anisotropy ($\Delta n$) to match a low cell thickness so as to achieve faster response time.

Liquid crystal materials should not only have the above characteristics, but should also have a wide nematic temperature range to meet the wide application fields of liquid crystal panels. For example, vehicle-mounted liquid crystal displays need to satisfy a wider working temperature in order to adapt to temperature changes in various regions and climates; and liquid crystal displays of industrial control products also need to satisfy a wider working temperature in order to adapt to temperature changes in various operating environments.

SUMMARY OF THE INVENTION

In order to solve the above-mentioned technical problems, the liquid crystal composition provided by the present invention has a relatively low rotational viscosity ($\gamma_1$), a high clearing point (Cp), a good solubility and a high stability to heat and light (VHR) on the basis of maintaining an appropriate optical anisotropy ($\Delta n$), and can realize a fast response of liquid crystal display.

To achieve the above object, the present invention uses the following technical solution:

The present invention provides a negative dielectric nematic liquid crystal composition, characterized by comprising a compound represented by Formula I, one or more compounds represented by Formula II, and one or more compounds represented by Formula III:

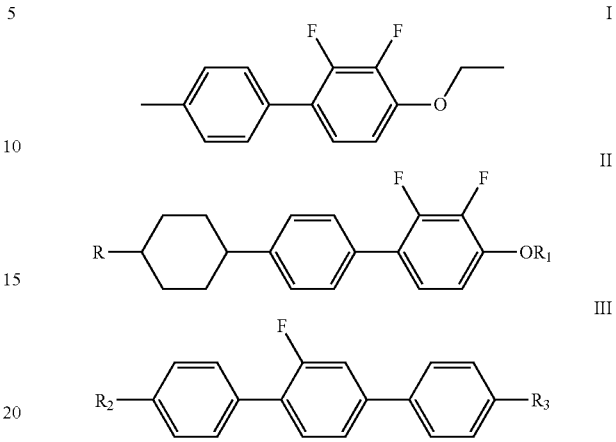

wherein

R and $R_3$ independently represent an alkyl with a carbon atom number of 1-10, a fluoro-substituted alkyl with a carbon atom number of 1-10, an alkoxy with a carbon atom number of 1-10, or a fluoro-substituted alkoxy with a carbon atom number of 1-10;

$R_1$ represents an alkyl with a carbon atom number of 1-10 or a fluoro-substituted alkyl with a carbon atom number of 1-10; and $R_2$ represents an alkenyl with a carbon atom number of 2-10 or a fluoro-substituted alkenyl with a carbon atom number of 2-10.

In order to obtain a liquid crystal composition having more outstanding performance and meeting different use requirements, the liquid crystal composition of the present invention may further comprise a compound represented by Formula IV other than the compound represented by Formula I, and one of or a combination of some of compounds represented by Formulas V to IX:

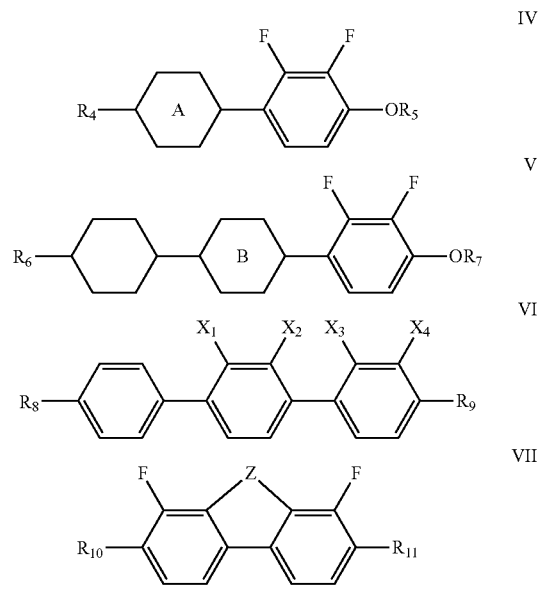

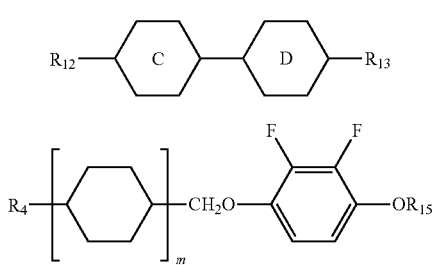

in Formula IV, $R_4$ and $R_5$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

represents

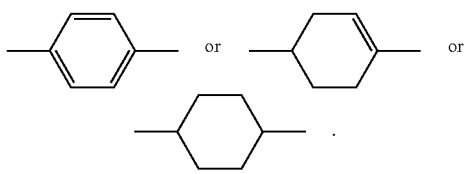

In Formula V, $R_6$ and $R_7$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

represents

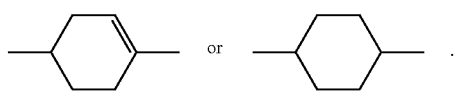

In Formula VI, $R_8$ and $R_9$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and $X_1$, $X_2$, $X_3$ and $X_4$ each independently represent H or F, and at least any two thereof simultaneously represent F.

In Formula VII, $R_{10}$ and $R_{11}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8, and any one or more —$CH_2$— in the groups represented by $R_{10}$ and $R_{11}$ are optionally replaced by cyclopentylene, cyclobutylene or cyclopropylene; and Z represents —O—, —S— or —$CH_2$O—.

In Formula VIII, $R_{12}$ and $R_{13}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

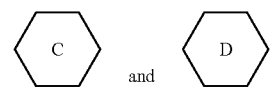

each independently represent 1,4-phenylene, 1,4-cyclohexylene or 1,4-cyclohexenylene.

In Formula IX, $R_{14}$ and $R_{15}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and m represents 1 or 2.

The present invention further provides a liquid crystal display element comprising the liquid crystal composition of the present invention, wherein the liquid crystal display element is an active matrix addressing display element or a passive matrix addressing display element.

The present invention further provides a liquid crystal display comprising the liquid crystal composition of the present invention, wherein the liquid crystal display is an active matrix addressing display or a passive matrix addressing display.

EFFECTS OF THE INVENTION

The liquid crystal composition of the present invention has a relatively low rotational viscosity ($\gamma_1$), a high clearing point (Cp), a good solubility and a high stability to heat and light (VHR) on the basis of maintaining an appropriate optical anisotropy ($\Delta n$), and can realize a fast response for a liquid crystal display. In addition, the liquid crystal composition disclosed by the present invention can be used for developing a high-frequency liquid crystal display element or liquid crystal display with a wide temperature display and a fast response.

DETAILED DESCRIPTION OF EMBODIMENTS

[Liquid Crystal Composition]

The present invention provides a negative dielectric nematic liquid crystal composition, characterized by comprising a compound represented by Formula I, one or more compounds represented by Formula II, and one or more compounds represented by Formula III:

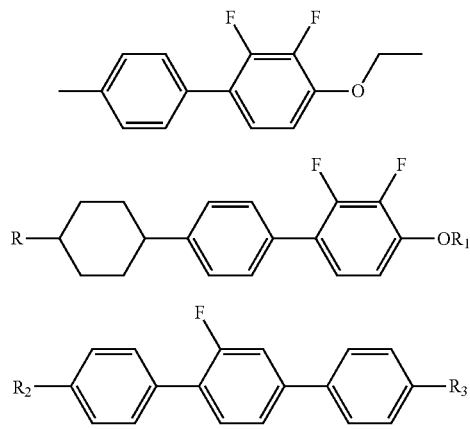

wherein

R and $R_3$ independently represent an alkyl with a carbon atom number of 1-10, a fluoro-substituted alkyl with a carbon atom number of 1-10, an alkoxy with a carbon atom number of 1-10, or a fluoro-substituted alkoxy with a carbon atom number of 1-10;

$R_1$ represents an alkyl with a carbon atom number of 1-10 or a fluoro-substituted alkyl with a carbon atom number of 1-10; and $R_2$ represents an alkenyl with a carbon atom number of 2-10 or a fluoro-substituted alkenyl with a carbon atom number of 2-10.

The liquid crystal composition of the present invention has a relatively low rotational viscosity ($\gamma_1$), a high clearing point (Cp), a good solubility and a high stability to heat and light (VHR) on the basis of maintaining an appropriate optical anisotropy ($\Delta n$), and can realize a fast response for a liquid crystal display.

The liquid crystal composition of the present invention preferably further comprises one or more compounds represented by Formula IV other than those represented by Formula I:

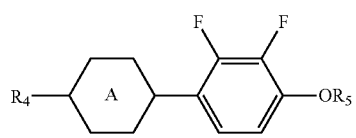

wherein $R_4$ and $R_5$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

represents

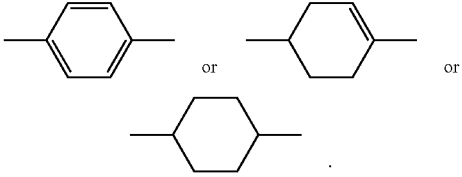

Preferably, in the liquid crystal composition of the present invention, the aforementioned compound represented by Formula IV is selected from the group consisting of compounds represented by Formulas IV-1 to IV-13:

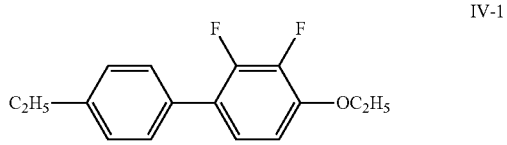

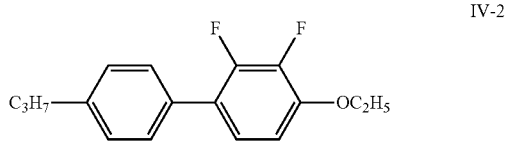

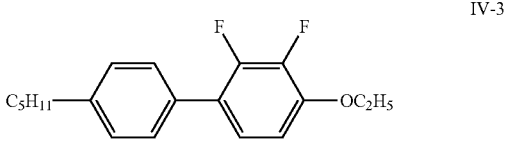

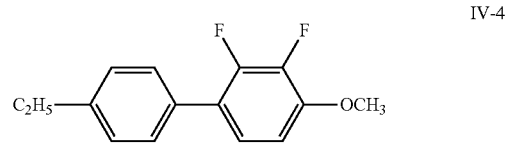

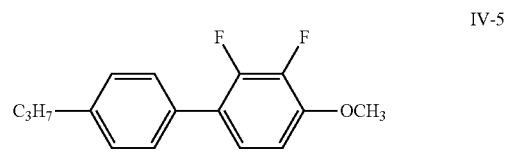

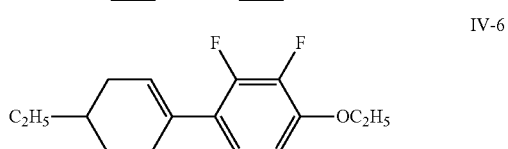

-continued

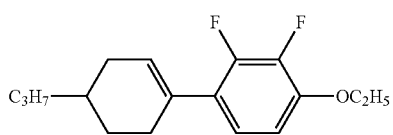
IV-7

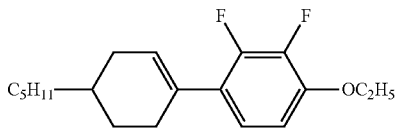
IV-8

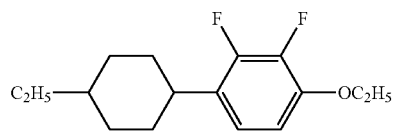
IV-9

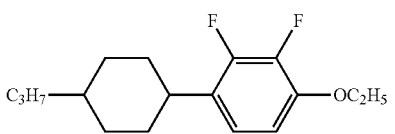
IV-10

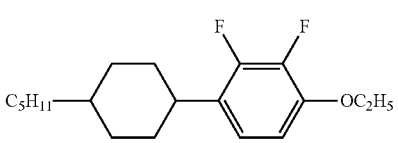
IV-11

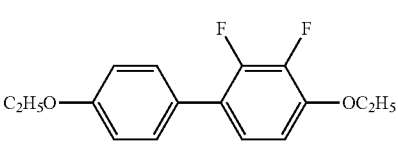
IV-12

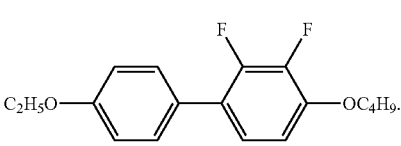
IV-13

The liquid crystal composition of the present invention preferably further comprises one or more compounds represented by Formula V:

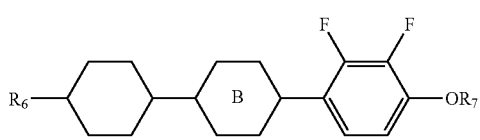
V wherein $R_6$ and $R_7$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

represents

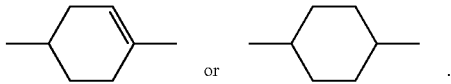

Preferably, in the liquid crystal composition of the present invention, the aforementioned compound represented by Formula V is selected from the group consisting of compounds represented by Formulas V-1 to V-30:

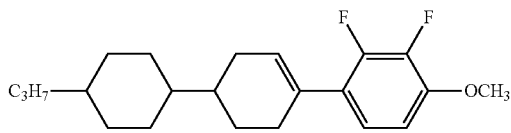
V-1

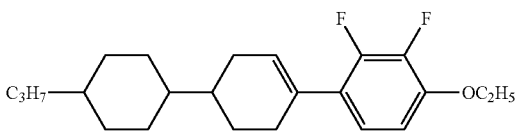
V-2

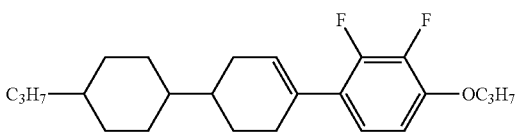
V-3

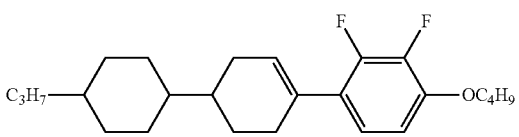
V-4

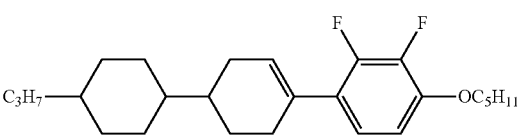
V-5

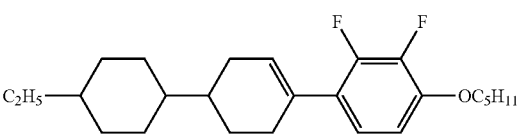
V-6

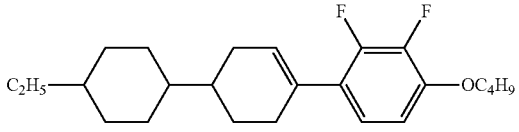
V-7

V-8
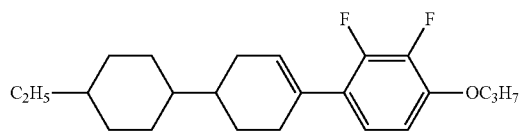
V-9
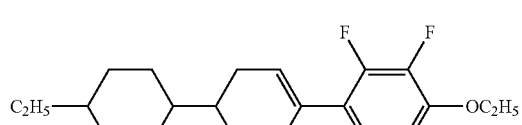
V-10
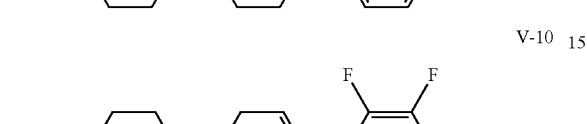
V-11
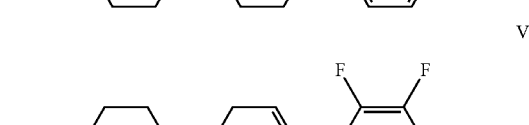
V-12
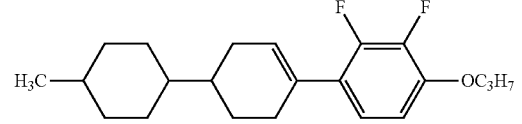
V-13
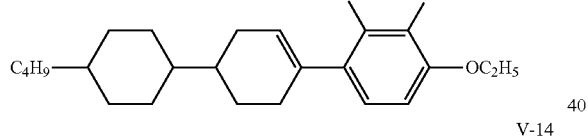
V-14
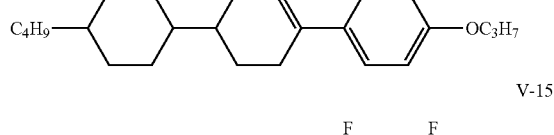
V-15
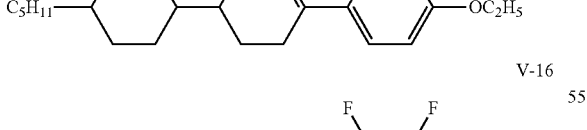
V-16
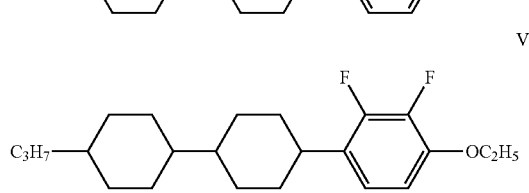
V-17
V-18
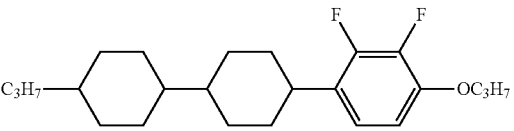
V-19
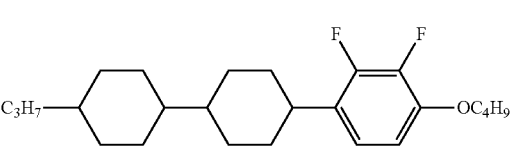
V-20
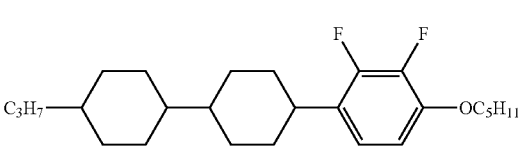
V-21
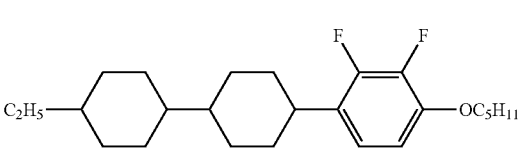
V-22
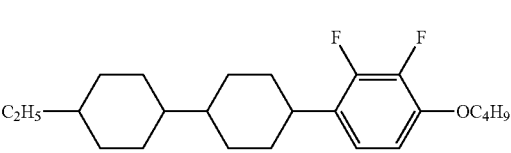
V-23
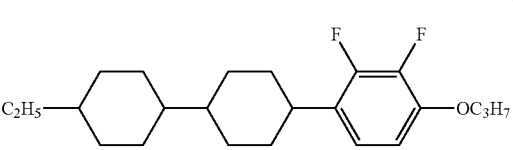
V-24
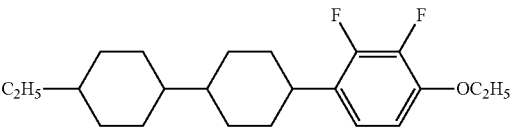
V-25
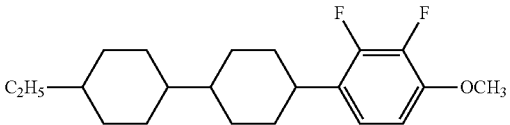
V-26
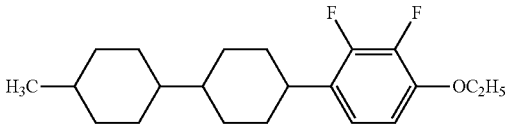
V-27
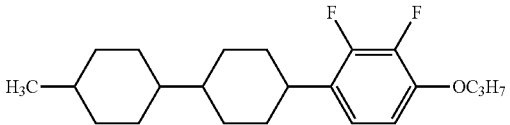

-continued

V-28
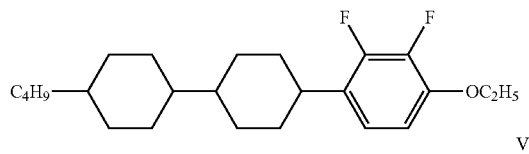

V-29
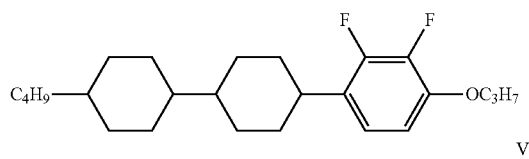

V-30
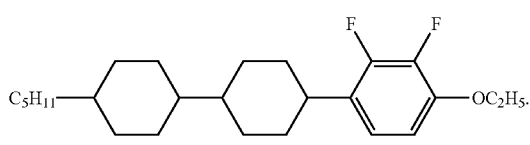

The liquid crystal composition of the present invention preferably further comprises one or more compounds represented by Formula VI:

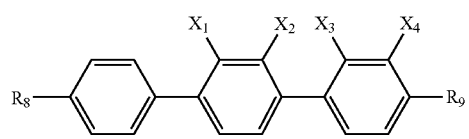
VI wherein $R_8$ and $R_9$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and $X_1$, $X_2$, $X_3$ and $X_4$ each independently represent H or F, and at least any two thereof simultaneously represent F.

Preferably, in the liquid crystal composition of the present invention, the aforementioned compound represented by Formula VI is selected from the group consisting of compounds represented by Formulas VI-1 to VI-15:

VI-1
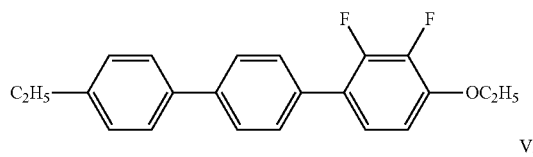

VI-2
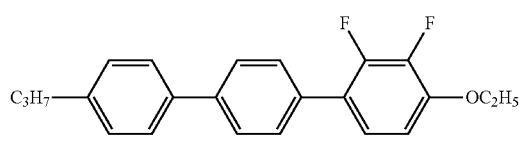

-continued

VI-3
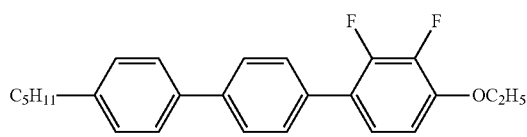

VI-4
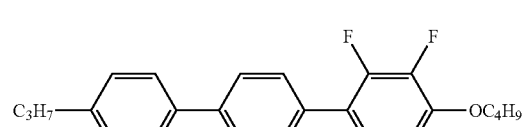

VI-5
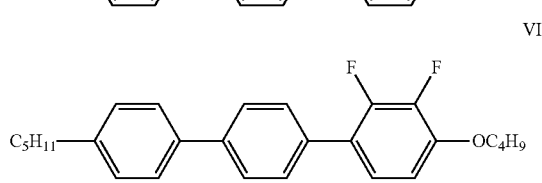

VI-6
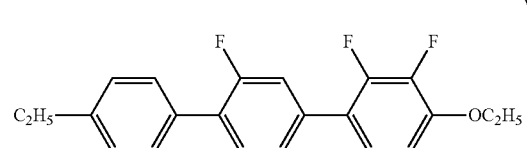

VI-7
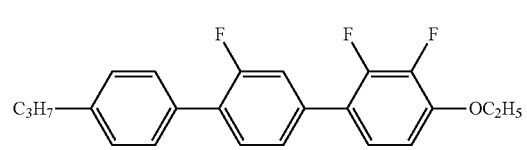

VI-8
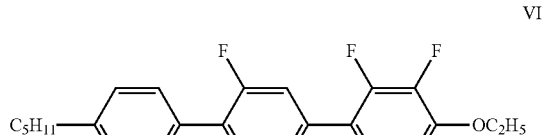

VI-9
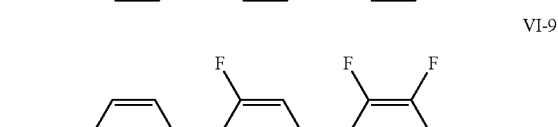

VI-10
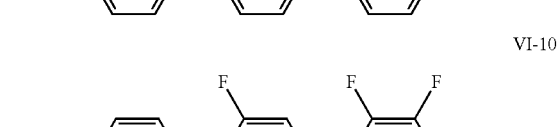

VI-11
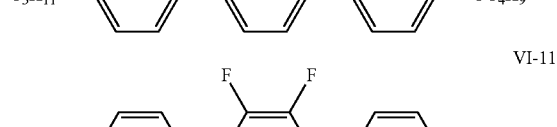

VI-12
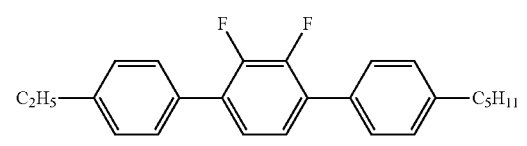

-continued

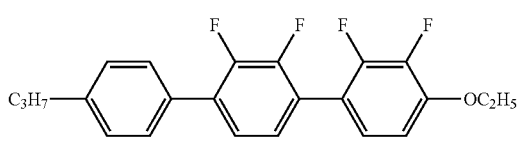
VI-13

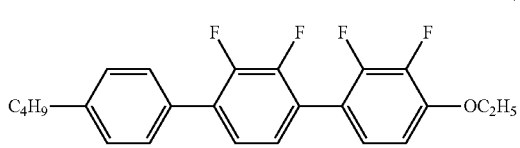
VI-14

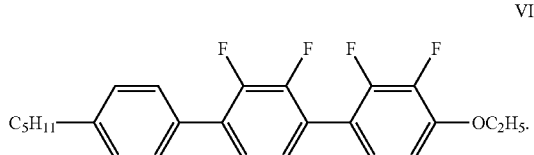
VI-15

The liquid crystal composition of the present invention preferably further comprises one or more compounds represented by Formula VII:

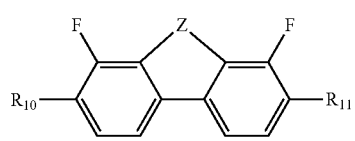
VII wherein $R_{10}$ and $R_{11}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8, and any one or more —CH$_2$— in the groups represented by $R_{10}$ and $R_{11}$ are optionally replaced by cyclopentylene, cyclobutylene or cyclopropylene; and Z represents —O—, —S— or —CH$_2$O—.

Preferably, in the liquid crystal composition of the present invention, the aforementioned compound represented by Formula VII is selected from the group consisting of compounds represented by Formulas VII-1 to VII-12:

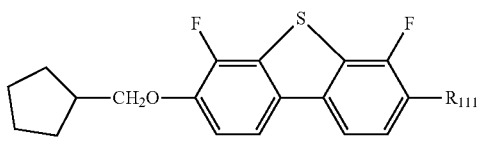
VII-1

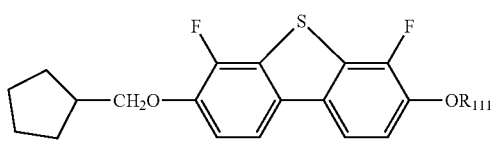
VII-2

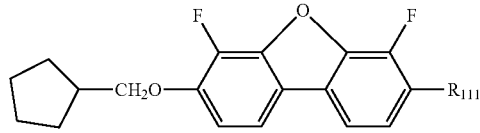
VII-3

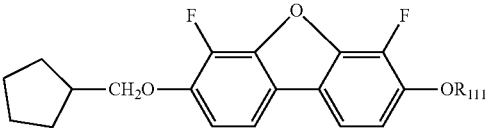
VII-4

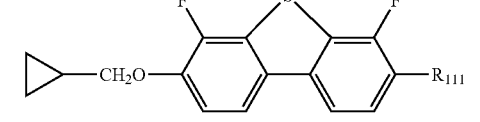
VII-5

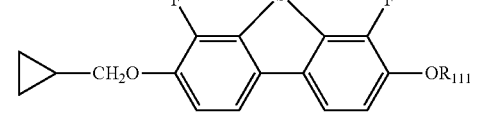
VII-6

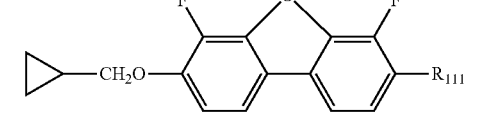
VII-7

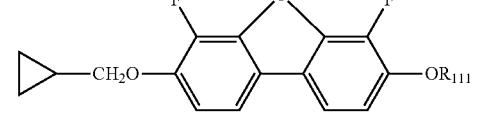
VII-8

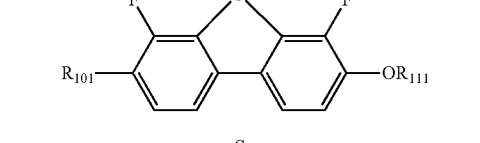
VII-9

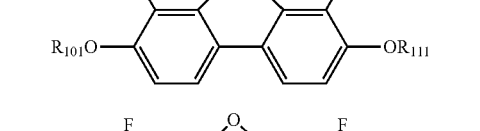
VII-10

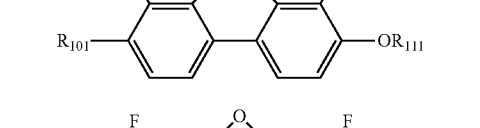
VII-11

VII-12 wherein $R_{101}$ and $R_{111}$ each independently represent an alkyl with a carbon atom number of 1-10.

The liquid crystal composition of the present invention preferably further comprises one or more compounds represented by Formula VIII:

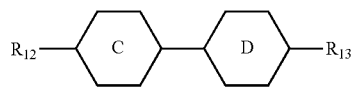
VIII $R_{12}$ and $R_{13}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

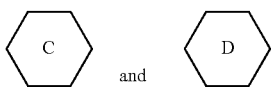

each independently represent 1,4-phenylene, 1,4-cyclohexylene or 1,4-cyclohexenylene.

Preferably, in the liquid crystal composition of the present invention, the aforementioned compound represented by Formula VIII is selected from the group consisting of compounds represented by Formulas VIII-1 to VIII-3:

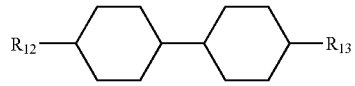
VIII-1

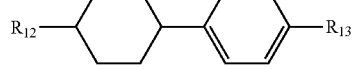
VIII-2

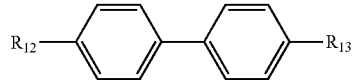
VIII-3 wherein $R_{12}$ and $R_{13}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8.

The liquid crystal composition of the present invention preferably further comprises one or more compounds represented by Formula IX:

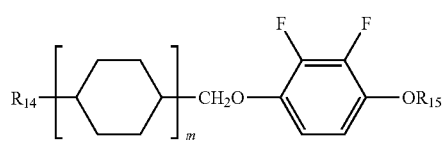
IX wherein $R_{14}$ and $R_{15}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and m represents 1 or 2.

Preferably, in the liquid crystal composition of the present invention, the aforementioned compound represented by Formula IX is selected from the group consisting of compounds represented by Formulas IX-1 to IX-15:

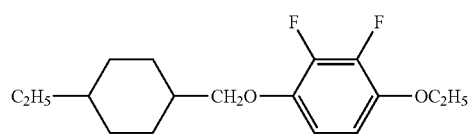
IX-1

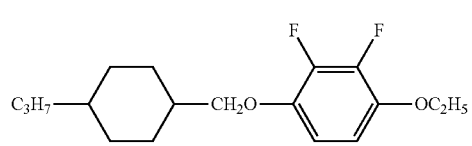
IX-2

IX-3

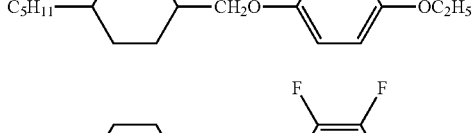
IX-4

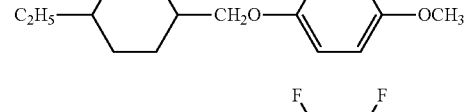
IX-5

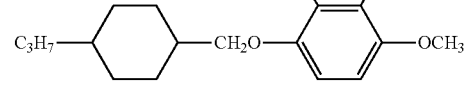
IX-6

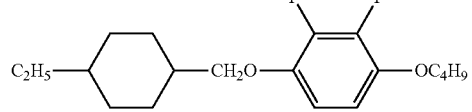
IX-7

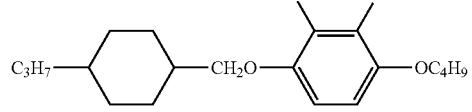
IX-8

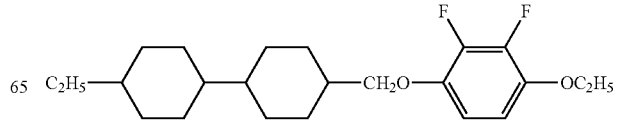

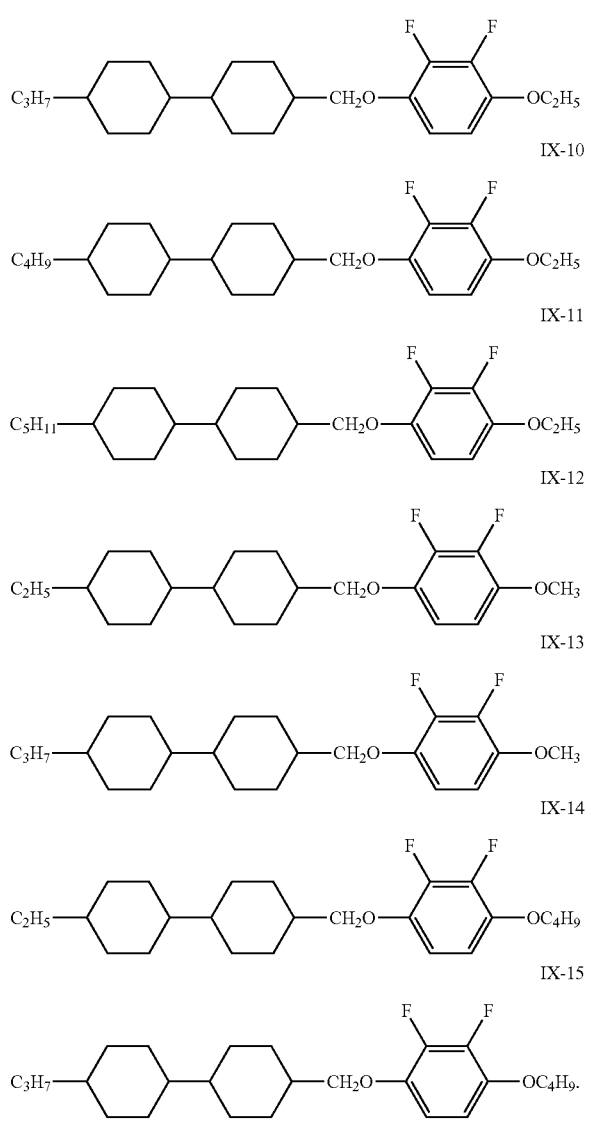

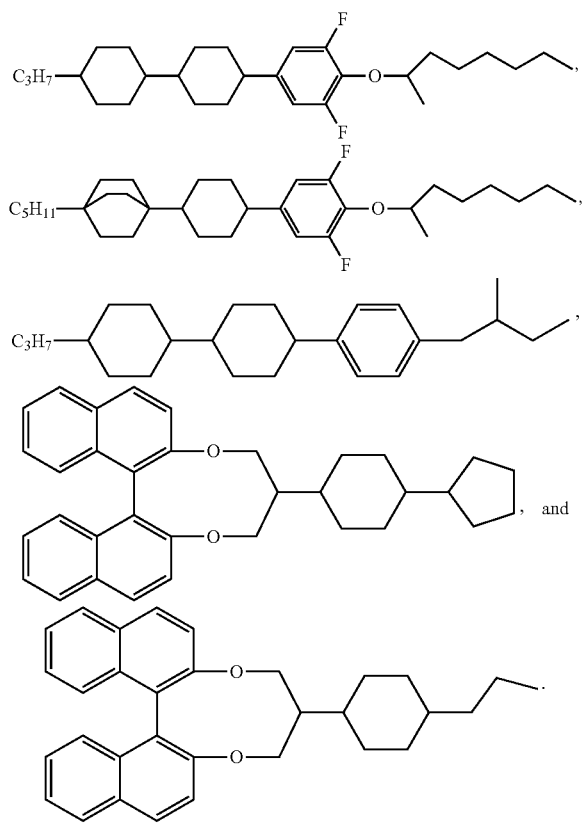

As the aforementioned alkyl with a carbon atom number of 1-10, methyl, ethyl, n-propyl, isopropyl, n-butyl, isobutyl, tert-butyl, n-pentyl, isopentyl, hexyl, heptyl, octyl, nonyl, decyl, etc. can be listed by for example.

As the aforementioned alkoxy with a carbon atom number of 1-10, methoxy, ethoxy, n-propoxy, isopropoxy, n-butoxy, isobutoxy, pentoxy, hexyloxy, heptyloxy, octyloxy, nonoxy, decyloxy, etc. can be listed for example.

As the aforementioned alkenyl with a carbon atom number of 2-10, vinyl, 1-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, etc. can be listed for example.

In the aforementioned fluoro-substituted alkyl with a carbon atom number of 1-10, fluoro-substituted alkoxy with a carbon atom number of 1-10, fluoro-substituted alkenyl with a carbon atom number of 2-10, and fluoro-substituted alkenoxy with a carbon atom number of 3-8, the term "fluoro-substituted" can be monofluoro-substituted, or polyfluoro-substituted, such as difluoro-substituted and trifluoro-substituted, or may also be perfluoro-substituted, and there is no particular limitation on the number of the instances of fluorine substitution. For example, as the fluoro-substituted alkyl with a carbon atom number of 1-10, fluoromethyl, difluoromethyl, trifluoromethyl, 1-fluoroethyl, 2-fluoroethyl, 1,2-difluoroethyl, 1,1-difluoroethyl, 1,1,2-trifluoroethyl, 1,1,1,2,2-pentafluoro-substituted ethyl, etc. can be listed, for example, without limitation.

A variety of functional dopants may also be added to the liquid crystal compound of the present invention, and the content of the dopants is preferably 0.01% and 1%. As the dopants, an antioxidant, an ultraviolet absorber and a chiral agent can be listed for example.

Examples of the chiral agent (levorotatory or dextrorotatory) are preferably, by way of example,

[Liquid Crystal Display Element or Liquid Crystal Display]

The present invention further relates to a liquid crystal display element or liquid crystal display comprising any one of the above-mentioned liquid crystal compositions; and the display element or display is an active matrix display element or display or a passive matrix display element or display.

The liquid crystal display element or liquid crystal display of the present invention is preferably an active matrix addressing liquid crystal display element or liquid crystal display.

As the aforementioned active matrix display element or display, TN-TFT or IPS-TFT or FFS-TFT or UV2A-TFT liquid crystal display elements or other TFT displays can be specifically listed for example.

The liquid crystal display element or liquid crystal display of the present invention comprises the liquid crystal composition disclosed in the present invention. The liquid crystal display element or liquid crystal display of the present

19 invention has a wider display temperature range, a fast response speed and a good reliability.

EXAMPLES

In order to explain the present invention more clearly, the present invention will be further explained below in conjunction with examples. A person skilled in the art should understand that the following detailed description is illustrative rather than restrictive, and should not limit the scope of protection of the present invention.

In the description, unless otherwise specified, the percentages all refer to mass percentages, the temperatures are degrees Celsius (° C.), and the specific meanings and test conditions of the other symbols are as follows:

Cp represents the clear point (° C.) of a liquid crystal, as measured by DSC quantitative method;

An represents optical anisotropy, $n_o$ is the refractive index of ordinary light and $n_e$ is the refractive index of extraordinary light, and the test conditions are 25° C.±2° C., 589 nm, and Abbe refractometer test;

Δε represents dielectric anisotropy, $\Delta\varepsilon=\varepsilon_\parallel-\varepsilon_\perp$, wherein $\varepsilon_\parallel$ is the dielectric constant parallel to the molecular axis, and $\varepsilon_\perp$ is the dielectric constant perpendicular to the molecular axis, and the test conditions are 25° C.±0.5° C., 20 μm vertical cell, and INSTEC:ALCT-IR1 test;

$\gamma_1$ represents rotational viscosity (mPa·s), and the test conditions are 25° C.±0.5° C., 20 μm vertical cell, and INSTEC:ALCT-IR1 test;

$K_{11}$ is splay elastic constant, $K_{33}$ is bend elastic constant, and the test conditions are: 25° C., INSTEC:ALCT-IR1, and 20 μm vertical cell; and VHR represents voltage retention rate (%), and the test conditions are 60° C.±1° C., voltage ±5 V, pulse width 10 ms, and voltage retention time 1.667 ms. The test equipment is TOYO Model 6254 LCD performance comprehensive tester.

For low-temperature storage, 1 g of sample liquid crystal is taken and placed in a 7 ml ampoule bottle (the ampoule bottle needs to be cleaned twice and dried) as a sample. Three samples form a group. If one sample crystallizes in a group, this group will be regarded as crystal precipitation, and the storage time is recorded. The storage condition is −20° C.±1° C., and the storage equipment is a thermostatic glove box; and the backlight aging conditions are backlight intensity 12000 nit, aging temperature 60° C.±1° C., and applied voltage AC 7 V.

The preparation method for the liquid crystal composition involves: weighing various liquid crystal monomers at a certain ratio and putting the liquid crystal monomers into a stainless steel beaker, placing the stainless steel beaker containing these liquid crystal monomers on a magnetic stirring instrument for heating and melting, adding a magnetic rotor to the stainless steel beaker when most of the liquid crystal monomers in the stainless steel beaker have melted, uniformly stirring the mixture, and cooling the mixture to room temperature to obtain the liquid crystal composition.

The structures of the liquid crystal monomers in the examples of the present invention are represented by codes, and the code representation method for liquid crystal ring structures, terminal groups and linker groups is shown in Tables 1 and 2 below.

20

TABLE 1

Corresponding codes of ring structures

| Ring structure | Corresponding code |
|---|---|
| (cyclohexane) | C |
| (cyclohexene) | P |
| (cyclohexene isomer) | L |
| (monofluorobenzene) | G |
| (monofluorobenzene isomer) | Gi |
| (difluorobenzene) | Y |
| (difluoro dibenzofuran) | W |
| (difluoro dibenzothiophene) | S |

TABLE 2

Corresponding codes of terminal groups and linker groups

| Terminal groups and linker groups | Corresponding code |
|---|---|
| $C_nH_{2n+1}$— | n- |
| $C_nH_{2n+1}O$— | nO- |
| —$CF_3$ | -T |
| —$OCF_3$ | -OT |
| —$CH_2O$— | -O- |
| —F | -F |
| —$CH_2CH_2$— | -E- |
| —CH=CH— | -V- |
| —CH=CH—$C_nH_{2n+1}$ | Vn- |
| (cyclopentane) | Cp- |

TABLE 2-continued

Corresponding codes of terminal groups and linker groups

| Terminal groups and linker groups | Corresponding code |
|---|---|
|  | Cpr- |
|  | Cpr1- |
| 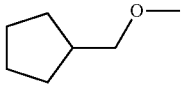 | CpO |
| 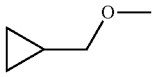 | CprO |

For example:

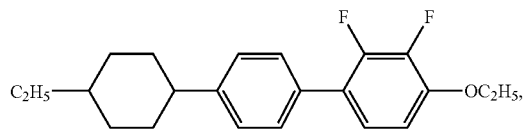 [SMILES: CCOc1ccc(-c2ccc(C3CCC(CC)CC3)cc2)c(F)c1F]

with the code being CPY-2-O2;

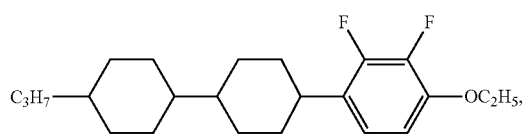

with the code being CCY-3-O2;

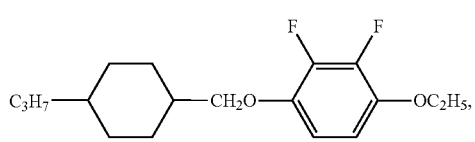

with the code being COY-3-O2;

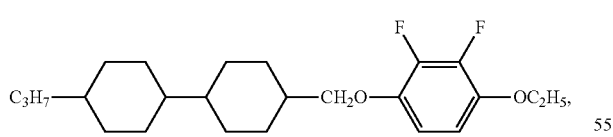

with the code being CCOY-3-O2;

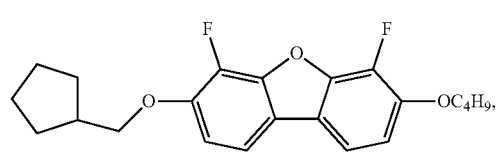

with the code being W-CpO-O4; and

with the code being S-CpO-O4.

Example 1

The formula and corresponding properties of the liquid crystal compositions were as shown in Table 3 below.

TABLE 3

Formula and corresponding properties of the liquid crystal composition of Example 1

| Class | Code of liquid crystal monomer | Content (%) |
|---|---|---|
| I | PY-1-O2 | 10 |
| II | CPY-2-O2 | 10 |
| II | CPY-3-O2 | 10 |
| III | PGP-2-2V | 10 |
| IV | CY-5-O2 | 5 |
| V | CLY-4-O2 | 5 |
| VI | PPY-3-O2 | 5 |
| VII | S-4O-O2 | 5 |
| VII | S-5O-O2 | 5 |
| VIII | CC-3-V | 30 |
| IX | COY-3-O2 | 5 |

Δε [1 KHz, 25° C.]: −3.9
Δn [589 nm, 25° C.]: 0.135
$K_{11}$: 14.0
$K_{33}$: 13.9
Cp: 80° C.
$\gamma_1$: 73.6 mPa · s
At 25° C.: no crystal precipitation
Placed at −20° C.: no crystal precipitation after 240 hours

Comparative Example 1

The formula and corresponding properties of the liquid crystal compositions were as shown in Table 4 below.

TABLE 4

Formula and corresponding properties of the liquid crystal composition of Comparative Example 1

| Class | Code of liquid crystal monomer | Content (%) |
|---|---|---|
| II | CPY-2-O2 | 10 |
| II | CPY-3-O2 | 10 |
| III | PGP-2-2V | 10 |
| IV | PY-3-O2 | 10 |
| IV | CY-5-O2 | 5 |
| V | CLY-4-O2 | 5 |
| VI | PPY-3-O2 | 5 |
| VII | S-4O-O2 | 5 |
| VII | S-5O-O2 | 5 |
| VIII | CC-3-V | 30 |
| IX | COY-3-O2 | 5 |

Δε [1 KHz, 25° C.]: −3.8
Δn [589 nm, 25° C.]: 0.130
$K_{11}$: 14.4
$K_{33}$: 13.7
Cp: 80° C.
$\gamma_1$: 80.9 mPa · s
At 25° C.: no crystal precipitation
Placed at −20° C.: no crystal precipitation after 240 hours The PY-1-O2 in Example 1 was replaced by PY-3-O2, as Comparative Example 1.

Comparative Example 2

The formula and corresponding properties of the liquid crystal compositions were as shown in Table 5 below.

TABLE 5

Formula and corresponding properties of the liquid crystal composition of Comparative Example 2

| Class | Code of liquid crystal monomer | Content (%) |
|---|---|---|
| II | CPY-2-O2 | 10 |
| II | CPY-3-O2 | 10 |
| III | PGP-2-2V | 10 |
| IV | PY-2O-O2 | 10 |
| IV | CY-5-O2 | 5 |
| V | CLY-4-O2 | 5 |
| VI | PPY-3-O2 | 5 |
| VII | S-4O-O2 | 5 |
| VII | S-5O-O2 | 5 |
| VIII | CC-3-V | 30 |
| IX | COY-3-O2 | 5 |

$\Delta\varepsilon$ [1 KHz, 25° C.]: −4.2
$\Delta n$ [589 nm, 25° C.]: 0.138
$K_{11}$: 14.4
$K_{33}$: 13.3
Cp: 83° C.
$\gamma_1$: 87.3 mPa · s
At 25° C.: no crystal precipitation
Placed at −20° C.: no crystal precipitation after 240 hours The PY-1-O2 in Example 1 was replaced by PY-2O-O2, as Comparative Example 2.

Comparative Example 3

The formula and corresponding properties of the liquid crystal compositions were as shown in Table 6 below.

TABLE 6

Formula and corresponding properties of the liquid crystal composition of Comparative Example 3

| Class | Code of liquid crystal monomer | Content (%) |
|---|---|---|
| I | PY-1-O2 | 10 |
| III | PGP-2-2V | 10 |
| IV | CY-5-O2 | 5 |
| V | CLY-3-O2 | 10 |
| V | CLY-3-O3 | 10 |
| V | CLY-4-O2 | 5 |
| VI | PPY-3-O2 | 5 |
| VII | S-4O-O2 | 5 |
| VII | S-5O-O2 | 5 |
| VIII | CC-3-V | 30 |
| IX | COY-3-O2 | 5 |

$\Delta\varepsilon$ [1 KHz, 25° C.]: −4.0
$\Delta n$ [589 nm, 25° C.]: 0.125
$K_{11}$: 15.8
$K_{33}$: 15.0
Cp: 83° C.
$\gamma_1$: 79.3 mPa · s
At 25° C.: no crystal precipitation
Placed at −20° C.: crystal precipitation occurred after 120 hours The CPY-2-O2 in Example 1 was replaced by CLY-3-O3, and the CPY-3-O2 was replaced by CLY-3-O2, as Comparative Example 3.

Comparative Example 4

The formula and corresponding properties of the liquid crystal compositions were as shown in Table 7 below.

TABLE 7

Formula and corresponding properties of the liquid crystal composition of Comparative Example 4

| Class | Code of liquid crystal monomer | Content (%) |
|---|---|---|
| I | PY-1-O2 | 10 |
| III | PGP-2-2V | 10 |
| IV | CY-5-O2 | 5 |
| V | CCY-2-O2 | 10 |
| V | CCY-3-O2 | 10 |
| V | CLY-4-O2 | 5 |
| VI | PPY-3-O2 | 5 |
| VII | COY-3-O2 | 5 |
| VIII | S-4O-O2 | 5 |
| VIII | S-5O-O2 | 5 |
| IX | CC-3-V | 30 |

$\Delta\varepsilon$ [1 KHz, 25° C.]: −4.0
$\Delta n$ [589 nm, 25° C.]: 0.122
$K_{11}$: 14.7
$K_{33}$: 14.4
Cp: 81° C.
$\gamma_1$: 82.3 mPa · s
At 25° C.: no crystal precipitation
Placed at −20° C.: no crystal precipitation after 240 hours The CPY-2-O2 in Example 1 was replaced by CCY-2-O2, and the CPY-3-O2 was replaced by CCY-3-O2, as Comparative Example 4.

Comparative Example 5

The formula and corresponding properties of the liquid crystal compositions were as shown in Table 8 below.

TABLE 8

Formula and corresponding properties of the liquid crystal composition of Comparative Example 5

| Class | Code of liquid crystal monomer | Content (%) |
|---|---|---|
| I | PY-1-O2 | 10 |
| II | CPY-2-O2 | 10 |
| II | CPY-3-O2 | 10 |
| IV | CY-5-O2 | 5 |
| V | CLY-4-O2 | 5 |
| VI | PPY-3-O2 | 5 |
| VII | S-4O-O2 | 5 |
| VII | S-5O-O2 | 5 |
| VIII | CC-3-V | 30 |
| IX | COY-3-O2 | 5 |
|  | PGP-2-3 | 10 |

$\Delta\varepsilon$ [1 KHz, 25° C.]: −3.8
$\Delta n$ [589 nm, 25° C.]: 0.132
$K_{11}$: 13.5
$K_{33}$: 13.7
Cp: 76° C.
$\gamma_1$: 81.8 mPa · s
At 25° C.: no crystal precipitation
Placed at −20° C.: crystal precipitation occurred after 120 hours The PGP-2-2V in Example 1 was replaced by PGP-2-3, as Comparative Example 5.

Comparative Example 6

The formula and corresponding properties of the liquid crystal compositions were as shown in Table 9 below.

TABLE 9

Formula and corresponding properties of the liquid crystal composition of Comparative Example 6

| Class | Code of liquid crystal monomer | Content (%) |
|---|---|---|
| I | PY-1-O2 | 10 |
| II | CPY-2-O2 | 10 |
| II | CPY-3-O2 | 10 |
| IV | CY-5-O2 | 5 |
| V | CLY-4-O2 | 5 |
| VI | PPY-3-O2 | 5 |
| VII | COY-3-O2 | 5 |
| VIII | S-4O-O2 | 5 |
| VIII | S-5O-O2 | 5 |
| IX | CC-3-V | 30 |
|  | CPP-3-2 | 10 |

Δε [1 KHz, 25° C.]: −3.9
Δn [589 nm, 25° C.]: 0.126
$K_{11}$: 14.6
$K_{33}$: 14.3
Cp: 81° C.
$γ_1$: 78.7 mPa · s
At 25° C.: no crystal precipitation
Placed at −20° C.: crystal precipitation occurred after 120 hours The PGP-2-2V in Example 1 was replaced by CPP-3-2, as Comparative Example 6.

Example 2

The formula and corresponding properties of the liquid crystal compositions were as shown in Table 10 below.

TABLE 10

Formula and corresponding properties of the liquid crystal composition of Example 2

| Class | Code of liquid crystal monomer | Content (%) |
|---|---|---|
| I | PY-1-O2 | 7 |
| II | CPY-5-O2 | 13 |
| III | PGP-2-2V | 15 |
| IV | PY-3-O2 | 10 |
| V | CLY-2-O4 | 5 |
| VI | PPY-5-O2 | 5 |
| VII | S-4O-O2 | 5 |
| VII | S-5O-O2 | 10 |
| VIII | CC-3-V | 30 |

Δε [1 KHz, 25° C.]: −3.6
Δn [589 nm, 25° C.]: 0.148
$K_{11}$: 14.3
$K_{33}$: 13.7
Cp: 79° C.
$γ_1$: 62.4 mPa · s
At 25° C.: no crystal precipitation
Placed at −20° C.: no crystal precipitation after 240 hours

Example 3

The formula and corresponding properties of the liquid crystal compositions were as shown in Table 11 below.

TABLE 11

Formula and corresponding properties of the liquid crystal composition of Example 3

| Class | Code of liquid crystal monomer | Content (%) |
|---|---|---|
| I | PY-1-O2 | 9 |
| II | CPY-3-O2 | 11 |
| III | PGP-2-2V | 5 |
| IV | LY-3-O2 | 7 |
| V | CLY-3-O2 | 5 |
| V | CLY-4-O2 | 6 |
| VI | PYY-3-O2 | 5 |
| VII | S-3O-O2 | 5 |
| VII | S-4O-O2 | 5 |
| VII | S-5O-O2 | 5 |
| VIII | CC-3-V | 37 |

Δε [1 KHz, 25° C.]: −3.9
Δn [589 nm, 25° C.]: 0.125
$K_{11}$: 14.0
$K_{33}$: 13.9
Cp: 81° C.
$γ_1$: 61.0 mPa · s
At 25° C.: no crystal precipitation
Placed at −20° C.: no crystal precipitation after 240 hours

Example 4

The formula and corresponding properties of the liquid crystal compositions were as shown in Table 12 below.

TABLE 12

Formula and corresponding properties of the liquid crystal composition of Example 4

| Class | Code of liquid crystal monomer | Content (%) |
|---|---|---|
| I | PY-1-O2 | 8 |
| II | CPY-3-O2 | 10 |
| III | PGP-2-2V | 7 |
| IV | CY-3-O2 | 5 |
| V | CLY-3-O2 | 5 |
| V | CLY-4-O2 | 6 |
| VI | PPY-3-O2 | 5 |
| VII | S-3O-O2 | 5 |
| VII | S-4O-O2 | 5 |
| VII | S-5O-O2 | 5 |
| VIII | CC-3-V | 33 |
| VIII | PP-1-2V1 | 6 |

Δε [1 KHz, 25° C.]: −3.8
Δn [589 nm, 25° C.]: 0.133
$K_{11}$: 15.3
$K_{33}$: 14.5
Cp: 80° C.
$γ_1$: 63.0 mPa · s
At 25° C.: no crystal precipitation
Placed at −20° C.: no crystal precipitation after 240 hours

Example 5

The formula and corresponding properties of the liquid crystal compositions were as shown in Table 13 below.

TABLE 13

Formula and corresponding properties of the liquid crystal composition of Example 5

| Class | Code of liquid crystal monomer | Content (%) |
|---|---|---|
| I | PY-1-O2 | 7 |
| II | CPY-3-O2 | 7 |
| III | PGP-2-2V | 6 |
| IV | CY-3-O2 | 7 |
| V | CLY-3-O2 | 5 |
| V | CLY-4-O2 | 6 |
| VI | PYP-3-2 | 5 |

TABLE 13-continued

Formula and corresponding properties of the
liquid crystal composition of Example 5

| Class | Code of liquid crystal monomer | Content (%) |
|---|---|---|
| VII | S-CpO-O2 | 5 |
| VII | S-CpO-O4 | 10 |
| VIII | CC-3-V | 37 |
| IX | COY-3-O2 | 5 |

Δε [1 KHz, 25° C.]: −4.4
Δn [589 nm, 25° C.]: 0.118
$K_{11}$: 14.9
$K_{33}$: 13.9
Cp: 80° C.
$\gamma_1$: 72.0 mPa · s
At 25° C.: no crystal precipitation
Placed at −20° C.: no crystal precipitation after 240 hours Example 6

The formula and corresponding properties of the liquid crystal compositions were as shown in Table 14 below.

TABLE 14

Formula and corresponding properties of the
liquid crystal composition of Example 6

| Class | Code of liquid crystal monomer | Content (%) |
|---|---|---|
| I | PY-1-O2 | 6 |
| II | CPY-3-O2 | 9 |
| III | PGP-2-2V | 5 |
| IV | CY-3-O2 | 7 |
| V | CLY-3-O2 | 5 |
| V | CCY-2-O2 | 6 |
| VI | PPY-3-O4 | 5 |
| VII | S-CpO-O2 | 5 |
| VII | S-CpO-O4 | 5 |
| VIII | CC-3-V | 32 |
| VIII | CP-3-O2 | 5 |
| IX | COY-3-O2 | 5 |
| IX | CCOY-3-O2 | 5 |

Δε [1 KHz, 25° C.]: −4.4
Δn [589 nm, 25° C.]: 0.122
$K_{11}$: 14.3
$K_{33}$: 13.9
Cp: 80° C.
$\gamma_1$: 75.1 mPa · s
At 25° C.: no crystal precipitation
Placed at −20° C.: no crystal precipitation after 240 hours Example 7

The formula and corresponding properties of the liquid crystal compositions were as shown in Table 15 below.

TABLE 15

Formula and corresponding properties of the
liquid crystal composition of Example 7

| Class | Code of liquid crystal monomer | Content (%) |
|---|---|---|
| I | PY-1-O2 | 7 |
| II | CPY-3-O2 | 8 |
| III | PGP-1-2V | 5 |
| IV | PY-5-O2 | 7 |
| V | CCY-3-O2 | 5 |
| V | CLY-5-O2 | 6 |
| VI | PGiY-3-O2 | 5 |
| VII | S-CpO-O2 | 5 |
| VII | S-CpO-O4 | 5 |

TABLE 15-continued

Formula and corresponding properties of the
liquid crystal composition of Example 7

| Class | Code of liquid crystal monomer | Content (%) |
|---|---|---|
| VIII | CC-3-V | 32 |
| VIII | CC-3-V1 | 5 |
| IX | COY-3-O1 | 5 |
| IX | CCOY-2-O2 | 5 |

Δε [1 KHz, 25° C.]: −4.4
Δn [589 nm, 25° C.]: 0.122
$K_{11}$: 14.3
$K_{33}$: 13.9
Cp: 80° C.
$\gamma_1$: 79.1 mPa · s
At 25° C.: no crystal precipitation
Placed at −20° C.: no crystal precipitation after 240 hours Example 8

The formula and corresponding properties of the liquid crystal compositions were as shown in Table 16 below.

TABLE 16

Formula and corresponding properties of the
liquid crystal composition of Example 8

| Class | Code of liquid crystal monomer | Content (%) |
|---|---|---|
| I | PY-1-O2 | 11 |
| II | CPY-2-O2 | 7 |
| III | PGP-2-2V | 7 |
| IV | PY-2O-O4 | 5 |
| V | CCY-3-O1 | 5 |
| V | CLY-4-O2 | 6 |
| VI | PGiY-3-O2 | 5 |
| VII | S-3O-O2 | 5 |
| VII | S-4O-O2 | 5 |
| VII | S-5O-O2 | 5 |
| VIII | CC-3-V | 33 |
|  | CCP-V-1 | 6 |

Δε [1 KHz, 25° C.]: −4.2
Δn [589 nm, 25° C.]: 0.133
$K_{11}$: 15.3
$K_{33}$: 14.5
Cp: 80° C.
$\gamma_1$: 72.0 mPa · s
At 25° C.: no crystal precipitation
Placed at −20° C.: no crystal precipitation after 240 hours Example 9

The formula and corresponding properties of the liquid crystal compositions were as shown in Table 17 below.

TABLE 17

Formula and corresponding properties of the
liquid crystal composition of Example 9

| Class | Code of liquid crystal monomer | Content (%) |
|---|---|---|
| I | PY-1-O2 | 9 |
| II | CPY-2-O2 | 8 |
| III | PGP-2-2V | 8 |
| IV | PY-3-O1 | 5 |
| V | CLY-3-O1 | 4 |
| V | CLY-4-O2 | 7 |
| VI | PGiY-5-O2 | 5 |
| VIII | S-5O-O2 | 7 |
| VIII | S-4O-O2 | 3 |
| VIII | W-5O-O2 | 5 |

TABLE 17-continued

Formula and corresponding properties of the
liquid crystal composition of Example 9

| Class | Code of liquid crystal monomer | Content (%) |
|---|---|---|
| IX | CC-3-V | 35 |
|  | CCP-V-1 | 4 |

Δε [1 KHz, 25° C.]: −4.2
Δn [589 nm, 25° C.]: 0.130
$K_{11}$: 13.8
$K_{33}$: 14.5
Cp: 81° C.
$γ_1$: 73.2 mPa · s
At 25° C.: no crystal precipitation
Placed at −20° C.: no crystal precipitation after 240 hours

Example 10

The formula and corresponding properties of the liquid crystal compositions were as shown in Table 18 below.

TABLE 18

Formula and corresponding properties of the
liquid crystal composition of Example 10

| Class | Code of liquid crystal monomer | Content (%) |
|---|---|---|
| I | PY-1-O2 | 10 |
| II | CPY-3-O2 | 10 |
| III | PGP-2-2V | 5 |
| IV | CY-3-O2 | 7 |
| V | CLY-3-O2 | 5 |
| V | CLY-4-O2 | 6 |
| VI | PPY-3-O2 | 5 |
| VII | W-3O-O2 | 5 |
| VII | W-4O-O2 | 5 |
| VII | W-5O-O2 | 5 |
| VIII | CC-3-V | 30 |
| VIII | CC-3-V1 | 7 |

Δε [1 KHz, 25° C.]: −3.9
Δn [589 nm, 25° C.]: 0.119
$K_{11}$: 12.0
$K_{33}$: 12.2
Cp: 78° C.
$γ_1$: 60.3 mPa · s
At 25° C.: no crystal precipitation
Placed at −20° C.: no crystal precipitation after 240 hours

TABLE 19

Comparison of VHR values of Examples
1-10 and Comparative Examples 1-6

| Experiment No. | VHR, initial (60° C., 0.6 Hz) | VHR, ultraviolet (60° C., 0.6 Hz) | VHR, high-temperature aging (60° C., 0.6 Hz) |
|---|---|---|---|
| Example 1 | 82.1% | 76.3% | 82.5% |
| Example 2 | 85.1% | 75.3% | 85.5% |
| Example 3 | 83.1% | 76.2% | 83.5% |
| Example 4 | 83.1% | 76.3% | 83.5% |
| Example 5 | 80.1% | 76.3% | 81.5% |
| Example 6 | 81.3% | 77.1% | 81.2% |
| Example 7 | 80.3% | 75.6% | 80.8% |
| Example 8 | 80.8% | 75.2% | 81.2% |
| Example 9 | 81.2% | 76.2% | 81.3% |
| Example 10 | 82.3% | 75.2% | 83.8% |
| Comparative Example 1 | 82.7% | 72.2% | 80.1% |
| Comparative Example 2 | 78.7% | 68.3% | 75.7% |
| Comparative Example 3 | 83.7% | 75.3% | 81.7% |
| Comparative Example 4 | 83.3% | 75.7% | 82.1% |
| Comparative Example 5 | 80.7% | 72.1% | 79.1% |
| Comparative Example 6 | 81.3% | 72.5% | 79.4% |

The reliability of the liquid crystal composition was tested by ultraviolet and high-temperature aging tests and VHR test. The smaller the change of the VHR data of the liquid crystal composition before and after the ultraviolet and high-temperature tests, the stronger the ultraviolet and high-temperature resistance. Therefore, the ultraviolet resistance and high-temperature resistance could be judged by comparing the difference of the VHR data of the examples and the comparative examples before and after the tests.

In the above experiment, the liquid crystals of the examples and the liquid crystals of the comparative examples were respectively poured into test pieces for testing. VHR represented voltage retention rate (%), and the test conditions were 60° C.±1° C., voltage ±5 V, pulse width 10 ms, and voltage retention time 1.667 ms. The test equipment was TOYO Model 6254 LCD performance comprehensive tester. The initial value of VHR was the data obtained by testing the test piece that did not undergo any treatment, and the VHR ultraviolet was the VHR value obtained by testing the piece filled with the liquid crystal after irradiation with 5000 mJ ultraviolet light at normal temperature. VHR high-temperature aging was the VHR value obtained by placing the piece filled with liquid crystal in a high-temperature oven at 100° C. for 1 hour. Compared with the comparative examples, the VHR data of the liquid crystal compositions of the examples before and after the ultraviolet and high-temperature tests all had smaller changes than the initial VHR values, so that they had strong resistance to external environment damage during the working process and a higher reliability, and could be better used for high-frequency and quick-response liquid crystal display element or liquid crystal display.

TABLE 20

Comparison table of normal temperature and low-temperature
storage of Examples 1-10 and Comparative Examples 1-6

| Experiment No. | 25° C. | Placed at −20° C. for 240 h |
|---|---|---|
| Example 1 | No crystal precipitation | No crystal precipitation |
| Example 2 | No crystal precipitation | No crystal precipitation |
| Example 3 | No crystal precipitation | No crystal precipitation |
| Example 4 | No crystal precipitation | No crystal precipitation |
| Example 5 | No crystal precipitation | No crystal precipitation |
| Example 6 | No crystal precipitation | No crystal precipitation |
| Example 7 | No crystal precipitation | No crystal precipitation |
| Example 8 | No crystal precipitation | No crystal precipitation |
| Example 9 | No crystal precipitation | No crystal precipitation |
| Example 10 | No crystal precipitation | No crystal precipitation |
| Comparative Example 1 | No crystal precipitation | No crystal precipitation |
| Comparative Example 2 | No crystal precipitation | No crystal precipitation |
| Comparative Example 3 | No crystal precipitation | Crystal precipitation |

TABLE 20-continued

Comparison table of normal temperature and low-temperature storage of Examples 1-10 and Comparative Examples 1-6

| Experiment No. | 25° C. | Placed at −20° C. for 240 h |
|---|---|---|
| Comparative Example 4 | No crystal precipitation | No crystal precipitation |
| Comparative Example 5 | No crystal precipitation | Crystal precipitation |
| Comparative Example 6 | No crystal precipitation | Crystal precipitation |

The liquid crystal composition of the present invention has a relatively low rotational viscosity ($\gamma_1$), a high clearing point (Cp), a good solubility, a wider working temperature range, and a high stability to heat and light (VHR) on the basis of maintaining an appropriate optical anisotropy ($\Delta n$), and can realize a fast response of liquid crystal display. The liquid crystal composition can be used for developing a high-frequency liquid crystal display element or liquid crystal display, and therefore, the display element or liquid crystal display comprising the liquid crystal composition disclosed by the present invention can be developed as a high-frequency liquid crystal display element or liquid crystal display with a wide temperature display and a fast response.

The above examples disclosed by the present invention are only to clearly illustrate the instances of the present invention, rather than defining the embodiments of the present invention. For those of ordinary skill in the art, other different forms of changes or variations can also be made on the basis of the above description. It is impossible to exhaustively list all the embodiments here, and all obvious changes or variations that are derived from the technical solution of the present invention are still within the scope of protection of the present invention.

The invention claimed is:

1. A negative dielectric nematic liquid crystal composition, comprising a compound represented by Formula I, one or more compounds represented by Formula II-2, II-9 and II-15, one compound represented by Formula III-2, one compound represented by Formula IV, one or more compounds represented by Formula V, one compound represented by Formula VI-2, VI-3 or VI-13, and one or more compounds represented by Formula VII:

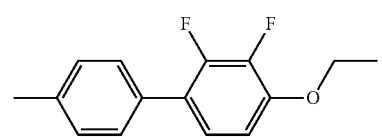

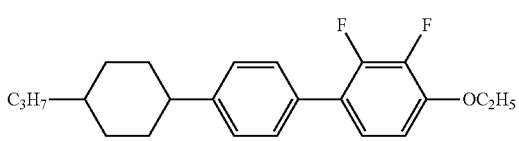

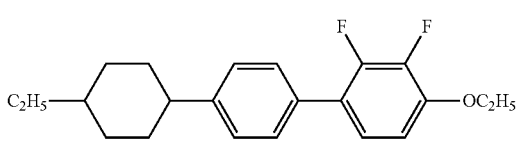

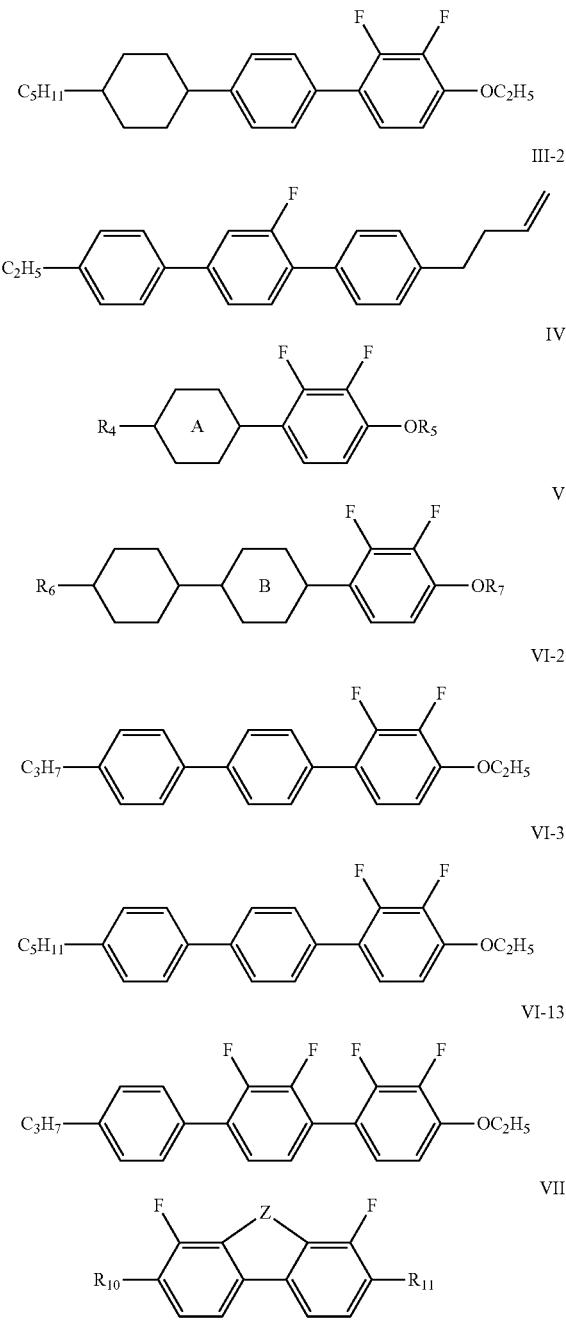

wherein $R_4$ represents an alkyl with a carbon atom number of 3-5; $OR_5$ represents an alkoxy with a carbon atom number of 2;

represents

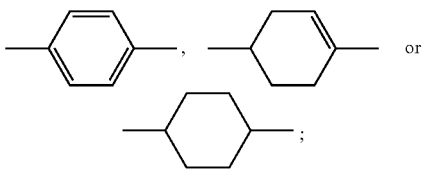

$R_6$ represents an alkyl with a carbon atom number of 2-4;
$OR_7$ represents an alkoxy with a carbon atom number of 2-4;

represents

$R_{10}$ and $R_{11}$ each independently represent an alkoxy with a carbon atom number of 2-5;
Z represents —S—,
a mass content of the compound represented by formula I is 7-10%, a mass content of one or more compounds represented by formula II-2, II-9 and II-15 is 10-20%, a mass content of the compound represented by Formula III-2 is 5-15%, a mass content of the compound represented by Formula IV is 5-10%, a mass content of one or more compounds represented by Formula V is 5-11%, a mass content of the compound represented by Formula VI-2, VI-3 or VI-13 is 5%, and a mass content of one or more compounds represented by Formula VII is 10-15%.

2. The liquid crystal composition according to claim 1, wherein the liquid crystal composition further comprises one or more compounds represented by Formula VIII:

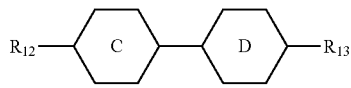

VIII $R_{12}$ and $R_{13}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and

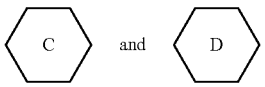

each independently represent 1,4-phenylene, 1,4-cyclohexylene or 1,4-cyclohexenylene.

3. The liquid crystal composition according to claim 1, wherein the liquid crystal composition further comprises one or more compounds represented by Formula IX:

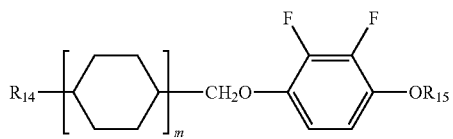

IX wherein
$R_{14}$ and $R_{15}$ each independently represent an alkyl with a carbon atom number of 1-10, a fluoro-substituted alkyl with a carbon atom number of 1-10, an alkoxy with a carbon atom number of 1-10, a fluoro-substituted alkoxy with a carbon atom number of 1-10, an alkenyl with a carbon atom number of 2-10, a fluoro-substituted alkenyl with a carbon atom number of 2-10, an alkenoxy with a carbon atom number of 3-8, or a fluoro-substituted alkenoxy with a carbon atom number of 3-8; and
m represents 1 or 2.

4. A liquid crystal display element or liquid crystal display comprising the liquid crystal composition according to claim 1, wherein the liquid crystal display element or liquid crystal display is an active matrix addressing display element or display, or a passive matrix addressing display element or display.

* * * * *